United States Patent [19]

Castelli et al.

[11] Patent Number: 5,075,702

[45] Date of Patent: Dec. 24, 1991

[54] ENCODER ROLL

[75] Inventors: Vittorio Castelli, Yorktown Heights; Richard M. Dastin, Fairport, both of N.Y.

[73] Assignee: Xerox Corporation, Stamford, Conn.

[21] Appl. No.: 548,311

[22] Filed: Jul. 2, 1990

[51] Int. Cl.[5] ...................... G01D 15/06; G01D 15/24

[52] U.S. Cl. .................................. 346/153.1; 346/136

[58] Field of Search ............................ 346/153.1, 136; 355/212

[56] References Cited

U.S. PATENT DOCUMENTS 4,082,443 4/1978 Draugelis et al. ...................... 355/4

4,365,888 12/1982 Hosaka et al. .................... 355/14 R 4,519,700 5/1985 Barker et al. .................... 355/3 SH 4,697,920 10/1987 Palm et al. ...................... 355/14 CH 4,739,230 4/1988 Sonobe et al. ...................... 318/301

*Primary Examiner*—George H. Miller, Jr.

*Attorney, Agent, or Firm*—H. Fleischer

[57] ABSTRACT

An encoder roll in which a rotatably mounted tube is adapted to be driven by a moving web. A layer of resilient material having a relatively high coefficient of friction is coated on one side marginal portion of the tube. The layer of resilient material is in engagement with the moving web so that movement of the web rotates the tube.

14 Claims, 2 Drawing Sheets

ENCODER ROLL

This invention relates generally to an electrophotographic printing machine, and more particularly concerns a control system using an encoder roll for regulating the velocity of a photoconductive belt.

In an electrophotographic printing machine, a photoconductive belt is charged to a substantially uniform potential to sensitize the surface thereof. The charged portion of the photoconductive belt is exposed. Exposure of the charged photoconductive member selectively dissipates the charge thereon in the irradiated areas. This records an electrostatic latent image on the photoconductive belt corresponding to the informational areas contained within the original document being reproduced. After the electrostatic latent image is recorded on the photoconductive belt, the latent image is developed by bringing toner into contact therewith. This forms a developed toner image on the photoconductive belt which is subsequently transferred to a copy sheet. The copy sheet is heated to permanently affix the toner image thereto in image configuration.

Multi-color electrophotographic printing is substantially identical to the foregoing process of black and white printing. However, rather than forming a single latent image on the photoconductive belt, successive latent images corresponding to different colors are recorded thereon. Each single color electrostatic latent image is developed with toner of a color complimentary thereto. This process is repeated a plurality of cycles for differently colored images and their respective complimentarily colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid material or a powder material.

In order to successfully transfer different color toner images to the copy sheet, the copy sheet moves in a recirculating path. The toner images are transferred to the copy sheet in superimposed registration with one another. Registration of successive toner images is critical for copy quality requirements. It is necessary to register successive toner image to within 125 microns of one another. The principle registration errors are due to exposure, copy sheet recirculation and photoconductive belt velocity variations. Velocity control of the photoconductive belt is critical since any position error in the latent image formation will cause misregistration. Most color copiers use a photoconductive drum which has a precisely controlled exterior diameter and is rotated by a direct drive servo motor. The feedback for the motor is on the drive shaft through a high resolution rotary encoder or the drive can be implemented by means of a high resolution stepper motor. Drum photoreceptors are typically used in a one pitch mode, i.e. one image per drum rotation, allowing drum runout error to be synchronous per separation, thereby eliminating drum runout as an error source. However, with a photoconductive belt, unique problems occur when trying to maintain accurate velocity control. There are a plurality of images recorded on the belt per belt revolution so that belt runout is not necessarily synchronous. The feedback of belt position from the belt module drive shaft is inaccurate due to belt compliance and poor diameter control of the rubber roll used for belt tracking. Another problem in controlling belt velocity is attributable to the belt manufacturing technique. The belt is made in long continuous sheets and later seamed with a welding fixture to create a complete loop that can be recirculated on the belt module rollers. When the belt is seamed, a conical loop is formed. Opposed side edges of the belt may have circumferences which differ by as much as 0.020 inches. Due to the difference in circumference from side edge to side edge, there is uncertainty as to which circumference will be controlling belt position. Various approaches have been devised for controlling the velocity of a photoreceptor. The following disclosures appear to be relevant:

U.S. Pat. No. 4,082,443, patentee: Draugelis et al., issued: Apr. 4, 1978.

U.S. Pat. No. 4,365,888, patentee: Hosaka et al., issued: Dec. 28, 1982.

U.S. Pat. No. 4,697,920, patentee: Palm et al., issued: Oct. 6, 1987.

U.S. Pat. No. 4,739,230, patentee: Sonobe et al., issued: Apr. 19, 1988.

The relevant portion of the foregoing patents may be briefly summarized as follows:

U.S. Pat. No. 4,082,443 discloses a multicolor electrophotographic printing machine having a bias transfer roll with a timing mark thereon. A sensor periodically detects the timing mark. The bias transfer roll and the photoconductive belt are driven by a common drive system. Another sensor detects the timing mark on the web moving the master. Digital logic circuitry associated with the sensors controls the timing of the flash assembly.

U.S. Pat. No. 4,365,888 describes a photoconductive belt having timing marks thereon. The belt is driven by a motor which also drives a pulse generator which produces timing pulses. The timing pulses from the motor pulse generator and the timing pulses generated by the belt are counted. The counted pulses are compared to a predetermined value and the motor adjusted to compensate for belt slip.

U.S. Pat. No. 4,697,920 discloses a photoconductive belt and an intermediate belt. Successive different color toner images are transferred from the photoconductive belt to the intermediate belt. Each belt is independently driven by a DC motor. Light chopper motion detectors are used to detect and quantify movement of the belts and the passage of an index mark on each belt past a predetermined reference point. A digital electronic controller synchronizes the movement of the two belts to assure proper registration of the toner images transferred from the photoconductive belt to the intermediate belt.

U.S. Pat. No. 4,739,230 describes a controller for regulating motor speed. The controller has an encoder and a feedback circuit to regulate motor speed. The encoder generates pulses which are compared to a reference pulse to determine any error and to correct the error.

Pursuant to the features of the present invention, there is provided an apparatus for regulating the velocity of a moving web. The apparatus includes means, extending across the web in a direction substantially perpendicular to the direction of movement of the web and having a portion thereof in frictional engagement with a side marginal region of the web to be driven thereby, for generating a signal indicative of the velocity of the web in the direction of movement thereof.

Means, responsive to the signal from the generating means, control the velocity of the web.

In another aspect of the present invention, there is provided an encoder roll adapted to be driven by a moving web. The encoder roll includes a rotatably mounted tube. A layer of resilient material having a relatively high coefficient of friction is coated on one side marginal portion of the tube. The resilient layer coated on the side marginal portion of the tube is adapted to be in engagement with the moving web so that movement of the web rotates the tube.

Still another aspect of the present invention is an electrophotographic printing machine of the type in which a photoconductive belt is adapted to have an electrostatic latent image recorded thereon. Developing means develop the electrostatic latent image to form a toner image on the photoconductive belt. Transfer means transfer the toner image from the photoconductive belt to a sheet of support material. A drive motor drives the photoconductive belt. The improvement includes means, extending across the photoconductive belt in a direction substantially perpendicular to the direction of movement of the photoconductive belt and having a portion thereof in frictional engagement with a side marginal region of the photoconductive belt to be driven thereby, for generating a signal indicative of the velocity of the photoconductive belt in the direction of movement thereof. Means, responsive to the signal from the generating means, control the drive motor to regulate the velocity of the photoconductive belt.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
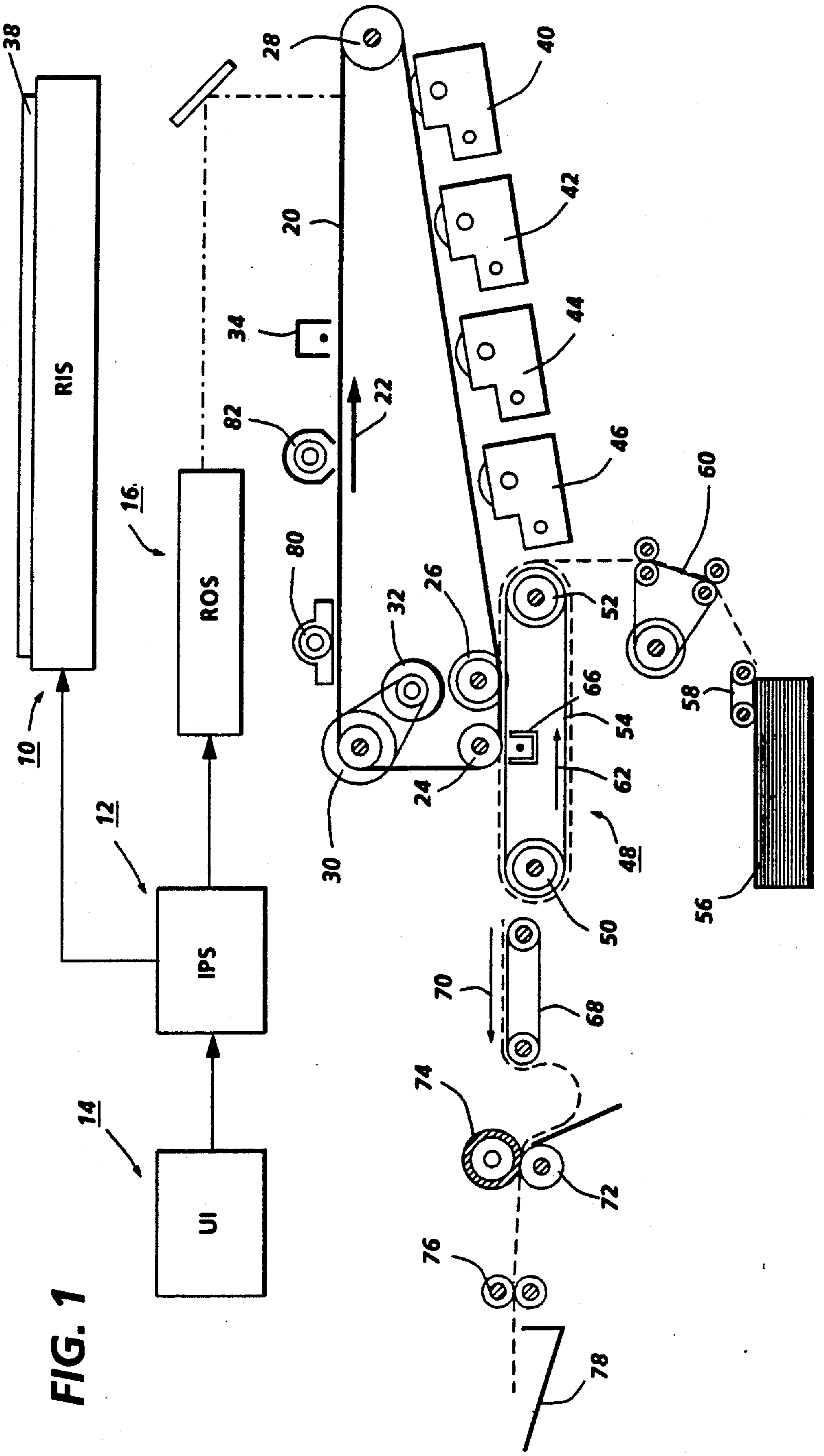
FIG. 1 is a schematic elevational view illustrating an electrophotographic printing machine incorporating the features of the present invention therein.

For a general understanding of the features of the present invention, reference is made to the drawings. In the drawings, like references have been used throughout to designate identical elements. FIG. 1 is a schematic elevational view of an illustrative multicolor electrophotographic printing machine incorporating the features of the present invention therein. It will become evident from the following discussion that the present invention is equally well suited for use in a wide variety of printing machines, and is not necessarily limited in its application to the particular machine shown herein.

Turning initially to FIG. 1, during operation of the printing machine, a multi-color original document 38 is positioned on a raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e. red, green and blue densities, at each point of the original document. This information is transmitted to an image processing system (IPS), indicated generally by the reference numeral 12. IPS 12 is the control electronics which prepare and manage the image data flow to the raster output scanner (ROS), indicated generally by the reference numeral 16. A user interface (UI), indicated generally by the reference numeral 14, is in communication with the IPS. The UI enables the operator to control the various operator adjustable functions. The output signal from the UI is transmitted to IPS 12. The signal corresponding to the desired image is transmitted from IPS 12 to ROS 16, which creates the output copy image. ROS 16 lays out the image in a series of horizontal scan lines with each line having a specified number of pixels per inch. The ROS includes a laser having a rotating polygon mirror block associated therewith. The ROS exposes the charged surface of the photoconductive belt 20 to achieve a set of subtractive primary latent images. The latent images are developed with cyan, magenta, and yellow developer material, respectively. These developed images are transferred to a copy sheet in superimposed registration with one another to form a multi-colored image on the copy sheet. This multi-colored image is then fused to the copy sheet forming a color copy.

With continued reference to FIG. 1, the photoconductive belt 20 is made preferably from a polychromatic photoconductive material. Belt 20 moves in the direction of arrow 22 to advance successive portions of the photoconductive surface sequentially through the various processing stations disposed about the path of movement thereof. Belt 20 is entrained about transfer roller 24, encoder roller 26, tensioning roller 28, and drive roller 30. Drive roller 30 is rotated by a motor 32 coupled thereto by suitable means such as a belt drive. As roller 30 rotates, it advances belt 20 in the direction of arrow 22. Further details of the control system used to regulate the velocity of photoconductive belt 20 will be described hereinafter with reference to FIG. 2.

Initially, a portion of photoconductive belt 20 passes through the charging station. At the charging station, a corona generating device, indicated generally by the reference numeral 34 charges photoconductive belt 20 to a relatively high, substantially uniform potential.

Next, the charged photoconductive surface is rotated to the exposure station. The exposure station includes the RIS 10 having a multicolored original document 38 positioned thereat. The RIS captures the entire image from the original document 38 and converts it to a series of raster scan lines which are transmitted as electrical signals to IPS 12. The electrical signals from the RIS correspond to the red, green and blue densities at each point in the document. The IPS converts the set of red, green and blue density signals, i.e. the set of signals corresponding to the primary color densities of original document 38, to a set of colorimetric coordinates. The operator actuates the appropriate keys of the UI 14 to adjust the parameters of the copy. UI 14 may be a touch screen or any other suitable control panel providing an operator interface with the system. The output signals from the UI are transmitted to the IPS. The IPS then transmits signals corresponding to the desired image to ROS 16. ROS 16 includes a laser with rotating polygon mirror blocks. Preferably, a nine facet polygon is used.

The ROS illuminates the charged portion of photoconductive belt 20 at a rate of about 400 pixels per inch. The ROS will expose the photoconductive belt to record three latent images. One latent image is adapted to be developed with cyan developer material. Another latent image is adapted to be developed with magenta developer material with the third latent image being developed with yellow developer material. The latent images formed by the ROS on the photoconductive belt correspond to the signals from IPS 12.

After the electrostatic latent image has been recorded on photoconductive belt 20, belt 20 advances the electrostatic latent image to the development station. The development station includes four individual developer units generally indicated by the reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 10, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of the operative position. In the operative position, the magnetic brush is closely adjacent the photoconductive belt, while, in the non-operative position, the magnetic brush is spaced therefrom. During development of each electrostatic latent image only one developer unit is in the operative position, the remaining developer units are in the non-operative position. This insures that each electrostatic latent image is developed with toner particles of the appropriate color without co-mingling. In FIG. 1, developer unit 40 is shown in the operative position with developer units 42, 44 and 46 being in the non-operative position.

After development, the toner image is moved to the transfer station where the toner image is transferred to a sheet of support material, such as plain paper amongst others. At the transfer station, the sheet transport apparatus, indicated generally by the reference numeral 48, moves the sheet into contact with photoconductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A friction retard feeder 58 advances the uppermost sheet from stack 56 onto a pretransfer transport 60. Transport 60 advances the sheet to sheet transport 48. The sheet is advanced by transport 60 in synchronism with the movement of the gripper. In this way, the leading edge of the sheet arrives at a preselected position, i.e. a loading zone to be received by the open gripper. The gripper then closes securing the sheet thereto for movement therewith in a recirculating path. The leading edge of the sheet is secured releasably by the gripper. As the belts move in the direction of arrow 62, the sheet moves into contact with the photoconductive belt, in synchronism with the toner image developed thereon. At the transfer zone, a corona generating device 66 sprays ions onto the backside of the sheet so as to charge the sheet to the proper magnitude and polarity for attracting the toner image from photoconductive belt 20 thereto. The sheet remains secured to the gripper so as to move in a recirculating path for three cycles. In this way, three different color toner images are transferred to the sheet in superimposed registration with one another. One skilled in the art will appreciate that the sheet may move in a recirculating path for four cycles when under color black removal is used and up to eight cycles when the information on two original documents is being merged onto a singe copy sheet. Each of the electrostatic latent images recorded on the photoconductive surface is developed with the appropriately colored toner which are transferred, in superimposed registration with one another, to the sheet to form the multi-color copy of the colored original document.

After the last transfer operation, the grippers open and release the sheet. Conveyor 68 transports the sheet, in the direction of arrow 70, to the fusing station where the transferred image is permanently fused to the sheet. The fusing station includes a heated fuser roll 74 and a pressure roll 72. The sheet 52 passes through the nip defined by fuser roll 74 and pressure roll 72. The toner image contacts fuser roll 74 so as to be affixed to the sheet. Thereafter, the sheet is advanced by forwarding roll pairs 76 to catch tray 78 for subsequent removal therefrom by the machine operator.

The last processing station in the direction of movement of belt 20, as indicated by arrow 22, is the cleaning station. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 2:
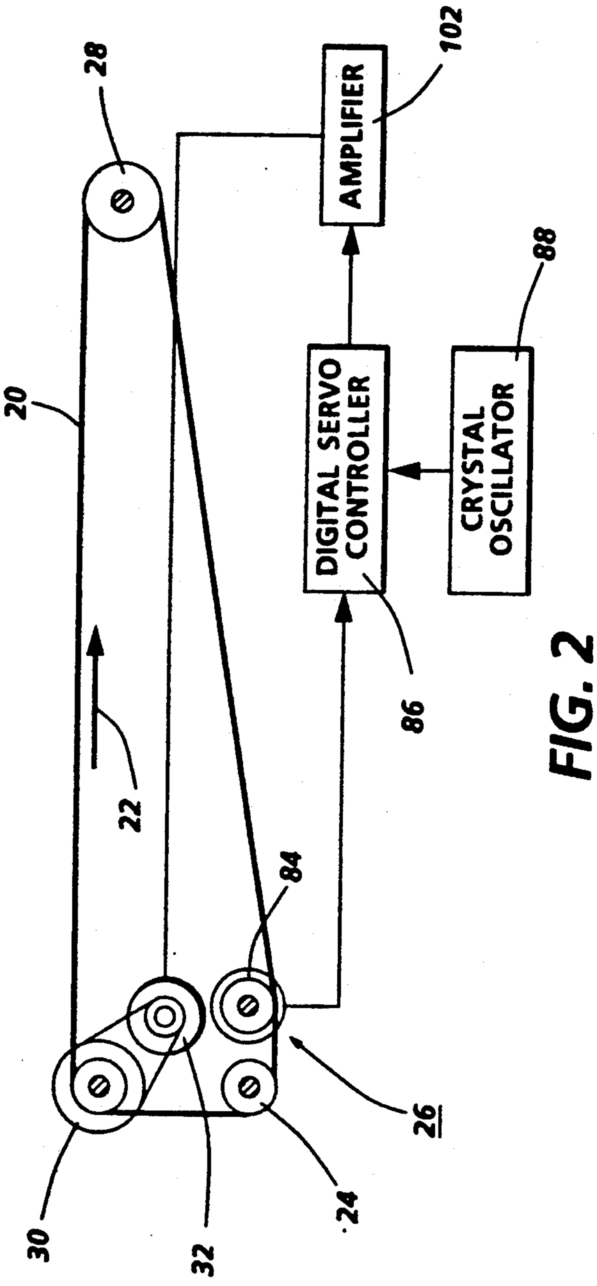
FIG. 2 is a schematic elevational view showing control system used to regulate the velocity of the photoconductive belt used in the FIG. 1 printing machine.

Referring now to FIG. 2, encoder roll 26 has an encoder disk 84 attached to one end of the encoder roll shaft. Encoder disk 84 has 500 timing marks on the surface thereof. A light source, such as a light emitting diode, and a light detector, such as a photodiode, are positioned on opposed sides of disk 84. In this way, as the encoder roll rotates 26 rotates, disk 84 rotates in unison therewith and 500 pulses per revolution of encoder disk 84 are generated by the photodiode. Of course, any suitable transducer may be used to measure the number of pulses generated by the encoder disk 84. Encoder roll 26 is driven frictionally by photoconductive belt 20. A side marginal portion of encoder roll 26 has a layer of resilient material coated thereon. This layer of resilient material has a high coefficient of friction and engages one side marginal portion of photoconductive belt 20. The remaining portion of the encoder roll is relatively smooth and has a relatively low coefficient of friction. Further details of encoder roll 26 will be described hereinafter with reference to FIG. 3.

With continued reference to FIG. 2, the pulses from the transducer associated with the encoder disk 84 track the angular position of encoder roll 26. The signal corresponding to these pulses is transmitted to a digital servo controller 86. A crystal oscillator 88 transmits a reference signal to digital servo controller 86. The encoder signal transmitted to digital servo controller 86 provides an accurate representation of the movement of the photoconductive belt 20. The crystal oscillator 88 provides a reference signal corresponding to a reference pulse rate. Digital servo controller 86 counts the number of reference pulses from crystal oscillator 88 and counts the number of pulses measured by the transducer associated with encoder disk 84. The measured count is compared with the reference count and an error signal, corresponding to the position correction, is generated. The error signal is transmitted to amplifier 102. Amplifier 90 controls the voltage source energizing motor 32. The amplified error signal from amplifier 102 adjusts the voltage exciting motor 32 to maintain the velocity of photoconductive belt 20 constant. This control system regulates the low frequency errors (0–24 Hz) of the photoconductive belt motion to be less than 10 microns peak to peak. This is required for accurate image to image registration.

Figure 3:
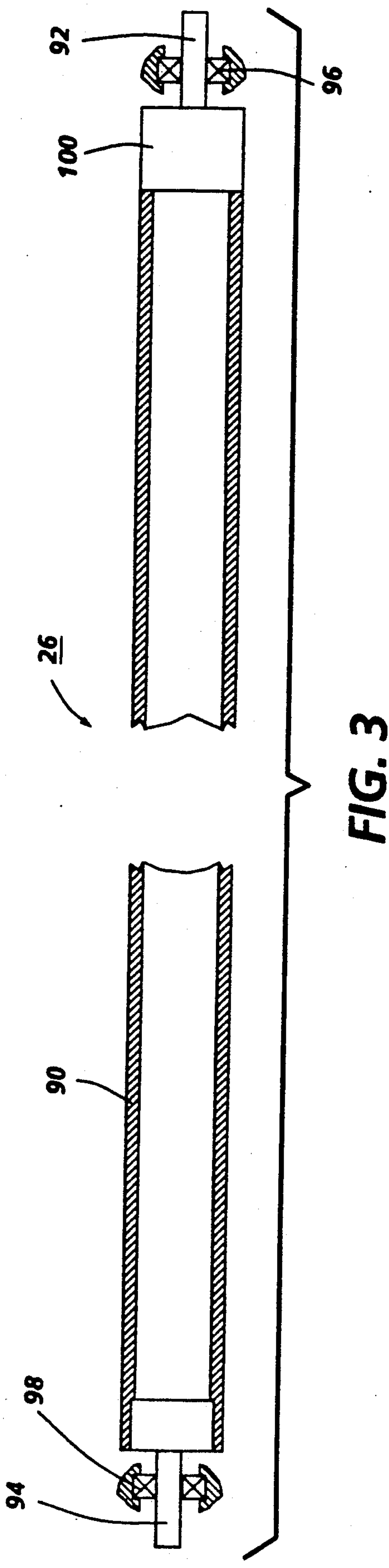
FIG. 3 is an elevational view through the longitudinal axis of the encoder roll used in the FIG. 2 control system.

Turning now to FIG. 3, there is shown encoder roller 26 in greater detail. As depicted thereat, encoder roller 26 is made from an aluminum tube 90. Tube 90 has shafts 92 and 94 extending outwardly from opposed ends thereof. Bearings 96 and 98 are mounted on shafts 92 and 94, respectively. These bearing are also mounted on the frame of the printing machine. In this way, tube 90 is mounted rotatably in the printing machine. Tube 90 is made from aluminum. A layer of resilient material 100 is coated on one side marginal portion of tube 90. The layer of resilient material has a relatively high coefficient of friction and contacts a side marginal portion of photoconductive belt 20. The frictional force between the photoconductive belt and the layer of resilient material coated on tube 90 rotates tube 90 in unison with the movement of belt 20. Preferably, resilient material 100 is polyurethane. By way of example, tube 90 may be about 414 millimeters in length with the coating of resilient material 100 extending from one side of tube 90 toward the other side a distance of about 25 millimeters. Thus, the layer of resilient material 100 is 25 millimeters wide. The coating of resilient material is about 0.05 millimeters thick. The remaining portion of tube 90 is polished to have a relatively low coefficient of friction so that photoconductive belt 20 slides thereover. The layer of resilient material on the aluminum tube insures that the encoder roll will always be driven by one side marginal portion of photoconductive belt 20, thereby insuring that the control system regulating photoconductive belt motion is insensitive to photoconductive belt and encoder roll conicalness.

In recapitulation, the encoder roll of the present invention has a layer of resilient material coated on one side marginal portion with the remaining portion of the roll having a low coefficient of friction. The resilient layer has a relatively high coefficient of friction and contacts a side marginal portion of the photoconductive belt. In this way, the frictional force between the photoconductive belt and the layer of resilient material rotates the encoder roll in unison with the movement of the photoconductive belt.

It is, therefore, evident that there has been provided in accordance with the present invention, an apparatus for regulating the motion of a photoconductive belt or web that is insensitive to conicalness of the belt and encoder roller to fully satisfy the aims and advantages hereinbefore set forth. While this invention has been described in conjunction with a specific apparatus, it is evident that many alternatives, modifications and variations will be apparent to those skilled in the art. Accordingly, it is intended to embrace all such alternatives, modifications and variations as fall within the spirit and broad scope of the appended claims.

We claim:

1. An apparatus for regulating the velocity of a moving web, including:

means, extending across the web in a direction substantially perpendicular to the direction of movement of the web and having a portion thereof in frictional engagement with a side marginal region of the web to be driven thereby, for generating a signal indicative of the velocity of the web in the direction of movement thereof; and means, responsive to the signal from said generating means, for controlling the velocity of the web.

2. An apparatus according to claim 1, wherein said controlling means includes oscillator means for generating a reference signal;

digital servo control means, responsive to the signal from said generating means and the reference signal, for generating a control signal; and a drive motor, coupled to the web and responsive to the control signal, for moving the web.

3. An apparatus according to claim 1, wherein said generating means includes a rotatably mounted encoder roll.

4. An apparatus according to claim 3, wherein said encoder roll includes a side marginal portion having a relatively high coefficient of friction adapted to engage a side marginal portion of the web so as to be rotated by the movement of the web with the remaining portion of the said encoder roll having a relatively low coefficient of friction so that the web slides thereover.

5. An apparatus according to claim 4, wherein said generating means includes an encoder disk mounted on one end of said encoder roll.

6. An apparatus according to claim 5, wherein the side marginal portion of said encoder roll is coated with a polyurethane material.

7. An apparatus according to claim 6, wherein said encoder roll is made from aluminum with the side marginal portion thereof being coated with a thin layer of polyurethane material and the remaining portion thereof being polished to have a low coefficient of friction.

8. An electrophotographic printing machine of the type having a photoconductive belt adapted to have an electrostatic latent image recorded thereon, developing means develop the electrostatic latent image to form a toner image on the photoconductive belt, transfer means transfer the toner image from the photoconductive belt to a sheet of support material, and a drive motor drives the photoconductive belt, wherein the improvement includes:

means, extending across the photoconductive belt in a direction substantially perpendicular to the direction of movement of the photoconductive belt and having a portion thereof in frictional engagement with a side marginal region of the photoconductive belt to be driven thereby, for generating a signal indicative of the velocity of the photoconductive belt in the direction of movement thereof; and means, responsive to the signal from said generating means, for controlling the drive motor to regulate the velocity of the photoconductive belt.

9. A printing machine according to claim 8, wherein said controlling means includes oscillator means for generating a reference signal;

digital servo control means, responsive to the signal from said generating means and the reference signal, for generating a control signal to regulate the drive motor for moving the photoconductive belt.

10. A printing machine according to claim 8, wherein said generating means includes a rotatably mounted encoder roll.

11. A printing machine according to claim 10, wherein said encoder roll includes a side marginal portion having a relatively high coefficient of friction adapted to engage a side marginal portion of the photoconductive belt so as to be rotated by the movement of the photoconductive belt with the remaining portion of the said encoder roll having a relatively low coefficient of friction so that the photoconductive belt slides thereover.

12. A printing machine according to claim 11, wherein said generating means includes an encoder disk mounted on one end of said encoder roll.

13. A printing machine according to claim 12, wherein the side marginal portion of said encoder roll is coated with a polyurethane material.

14. A printing machine according to claim 13, wherein said encoder roll is made from aluminum with the side marginal portion thereof being coated with a thin layer of polyurethane material and the remaining portion thereof being polished to have a low coefficient of friction.

* * * * *